United States Patent
DiRisio

(10) Patent No.: US 6,580,878 B2
(45) Date of Patent: Jun. 17, 2003

(54) SIMPLIFIED SHUTTER RELEASE ASSEMBLY AND CAMERA HAVING SAME

(75) Inventor: Anthony DiRisio, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/943,202

(22) Filed: Aug. 30, 2001

(65) Prior Publication Data

US 2003/0044181 A1 Mar. 6, 2003

(51) Int. Cl.⁷ .................... G03B 17/02; G03B 17/42; G03B 1/00; G03B 9/00
(52) U.S. Cl. .................... 396/396; 396/6; 396/401; 396/444
(58) Field of Search .................... 396/6, 395, 396, 396/401, 443, 444

(56) References Cited

U.S. PATENT DOCUMENTS

| | | | |
|---|---|---|---|
| 2,029,918 A | 4/1936 | Fuerst | 396/387 |
| 2,404,291 A | 7/1946 | Hunter | 396/396 |
| 3,394,643 A | 7/1968 | Horton et al. | 396/389 |
| 3,633,477 A | 1/1972 | Hackenberg et al. | 396/400 |
| 3,653,306 A | 4/1972 | Takahama | 396/29 |
| 3,673,941 A | 7/1972 | Williams | 396/392 |
| 3,741,097 A | 6/1973 | Fukuda et al. | 396/411 |
| 3,768,388 A | 10/1973 | Hackenberg et al. | 396/502 |
| 3,845,493 A | 10/1974 | Hackenberg et al. | 396/400 |
| 3,906,530 A | 9/1975 | Oshima | 396/400 |
| 4,032,940 A | 6/1977 | Chan | 396/348 |
| 4,193,678 A * | 3/1980 | In Son | 396/401 |
| 4,213,687 A | 7/1980 | Hattis et al. | 396/400 |
| 4,681,416 A | 7/1987 | Raschke | 396/392 |
| 4,949,111 A | 8/1990 | Alligood | 396/397 |
| 5,005,035 A | 4/1991 | Pagano | 396/396 |
| 5,602,604 A | 2/1997 | SanGregory | 396/25 |
| 5,724,622 A * | 3/1998 | Balling et al. | 396/396 |
| 5,870,640 A * | 2/1999 | DiRisio et al. | 396/401 |
| 5,887,208 A | 3/1999 | Freund | 396/395 |
| 5,897,224 A | 4/1999 | Freund | 396/25 |
| 6,092,936 A * | 7/2000 | DiRisio | 396/443 |
| 6,400,911 B1 * | 6/2002 | Schröder | 396/401 |

FOREIGN PATENT DOCUMENTS

DE    19636450    12/1998

* cited by examiner

Primary Examiner—Russell Adams
Assistant Examiner—Rochelle Blackman
(74) Attorney, Agent, or Firm—Roland R. Schindler, II

(57) ABSTRACT

The invention relates to a shutter release apparatus for use in a camera for capturing images on a perforated film. The shutter release apparatus has a rotatable thumb wheel movable along an axis between a start position and a trigger position. A sprocket is provided having teeth to engage perforations on the film and to move therewith during film winding. A biased lever is moved by the sprocket against the bias from a position holding the thumb wheel in the start position to a position releasing the thumb wheel for urged movement into the trigger position. The thumb wheel blocks biased movement of the lever when the thumb wheel is in the trigger position and movement of the thumb wheel from the trigger position to the start position releases the lever for biased movement to drive the shutter to expose the film.

26 Claims, 17 Drawing Sheets

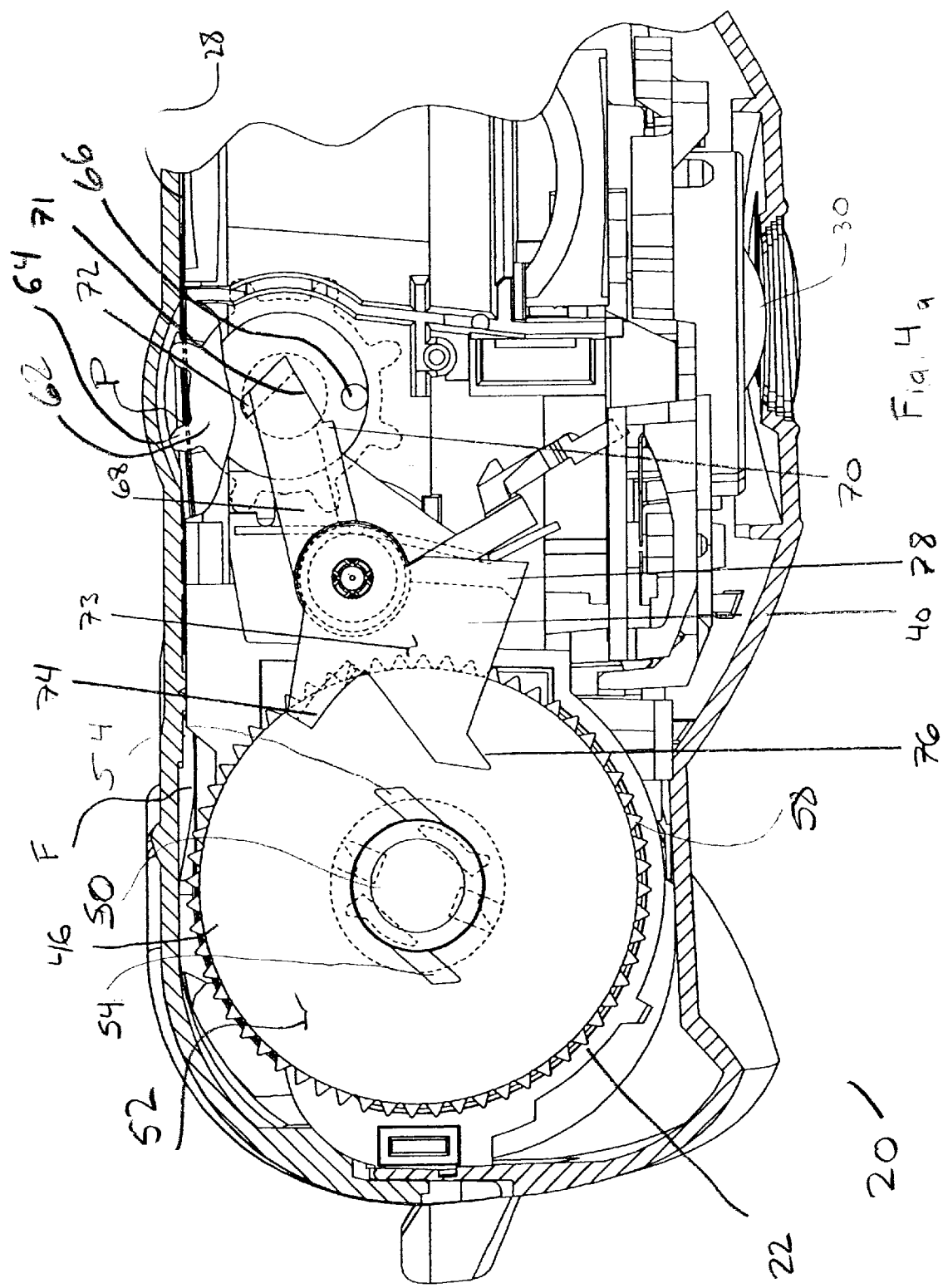

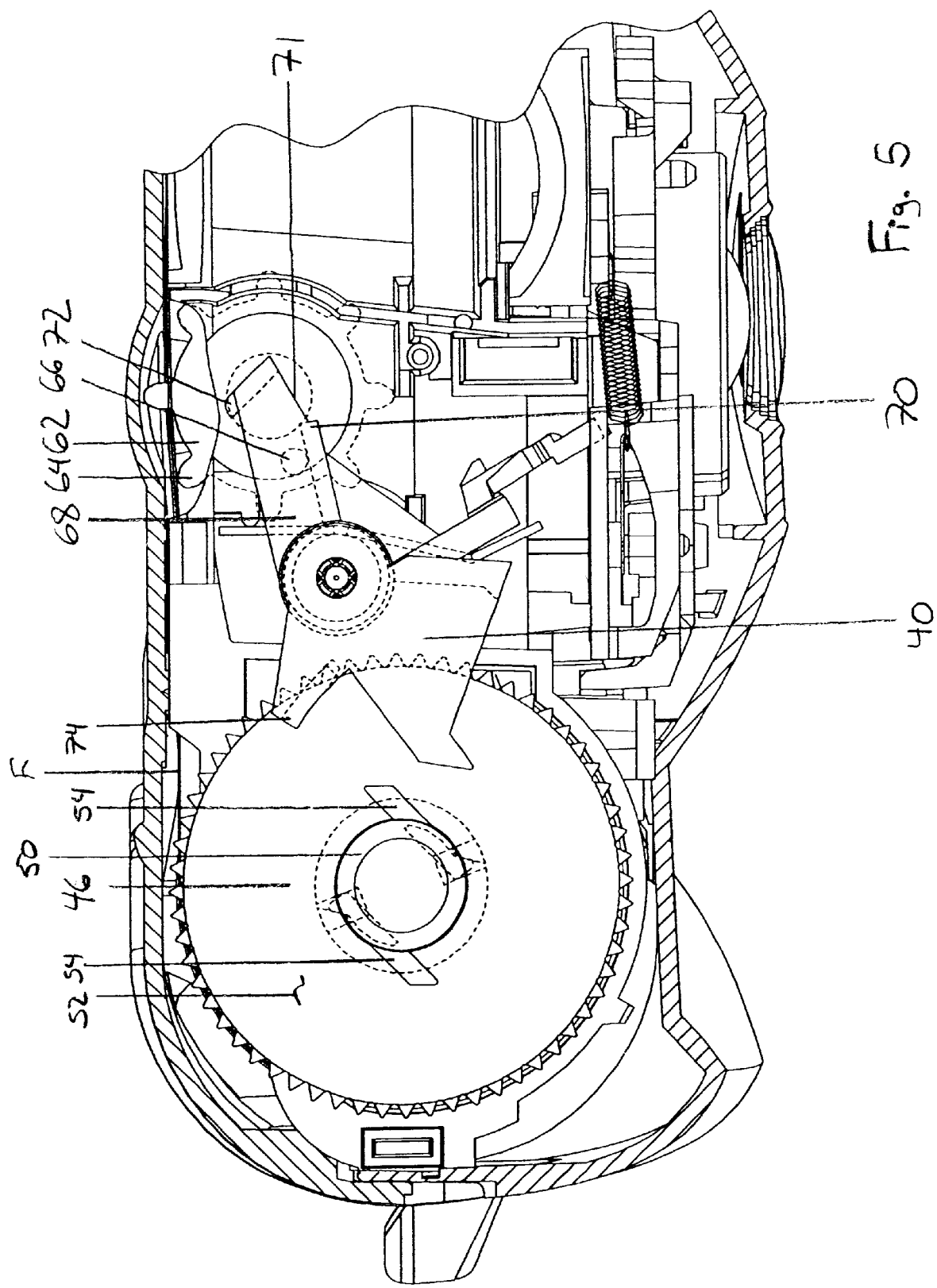

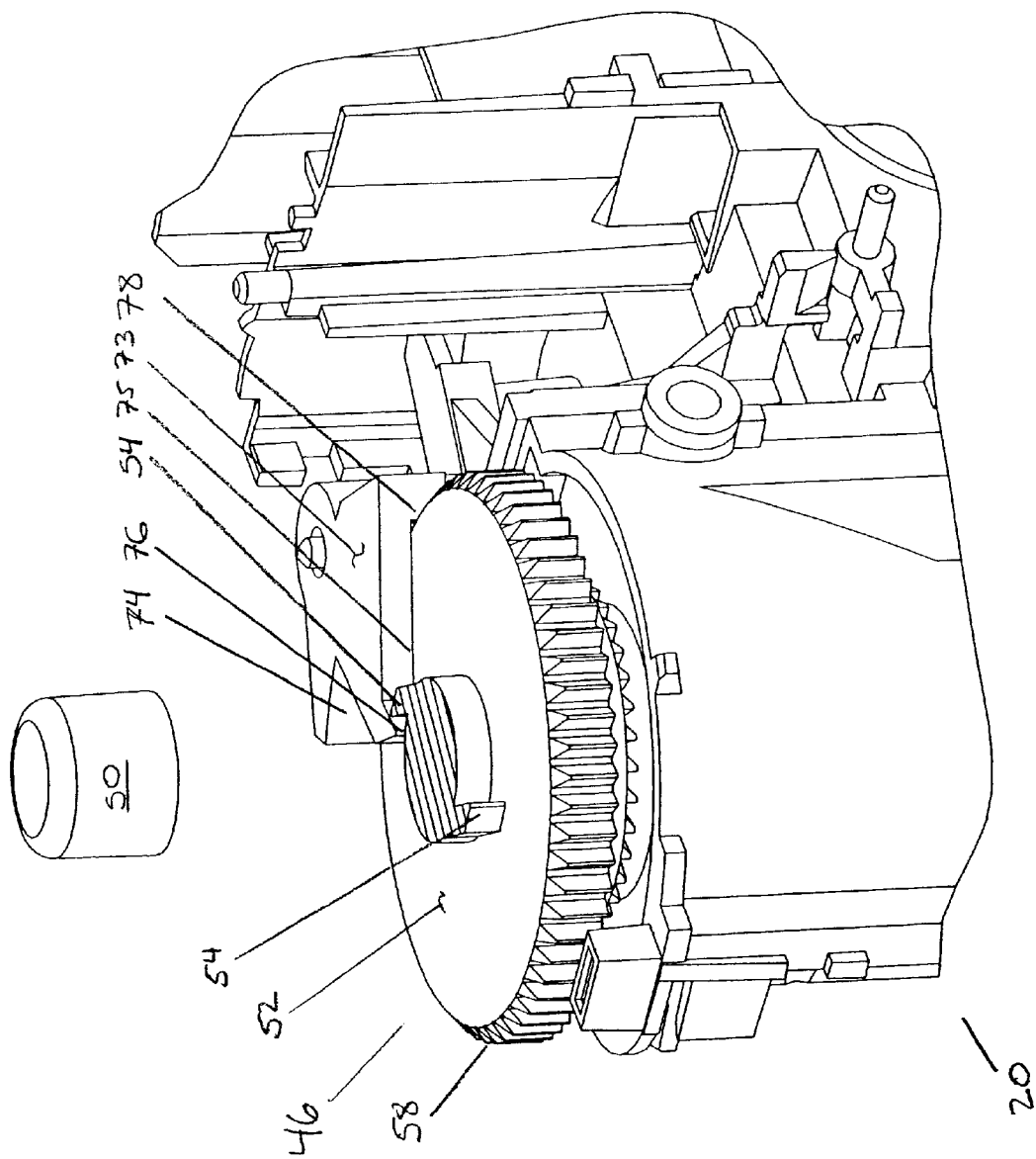

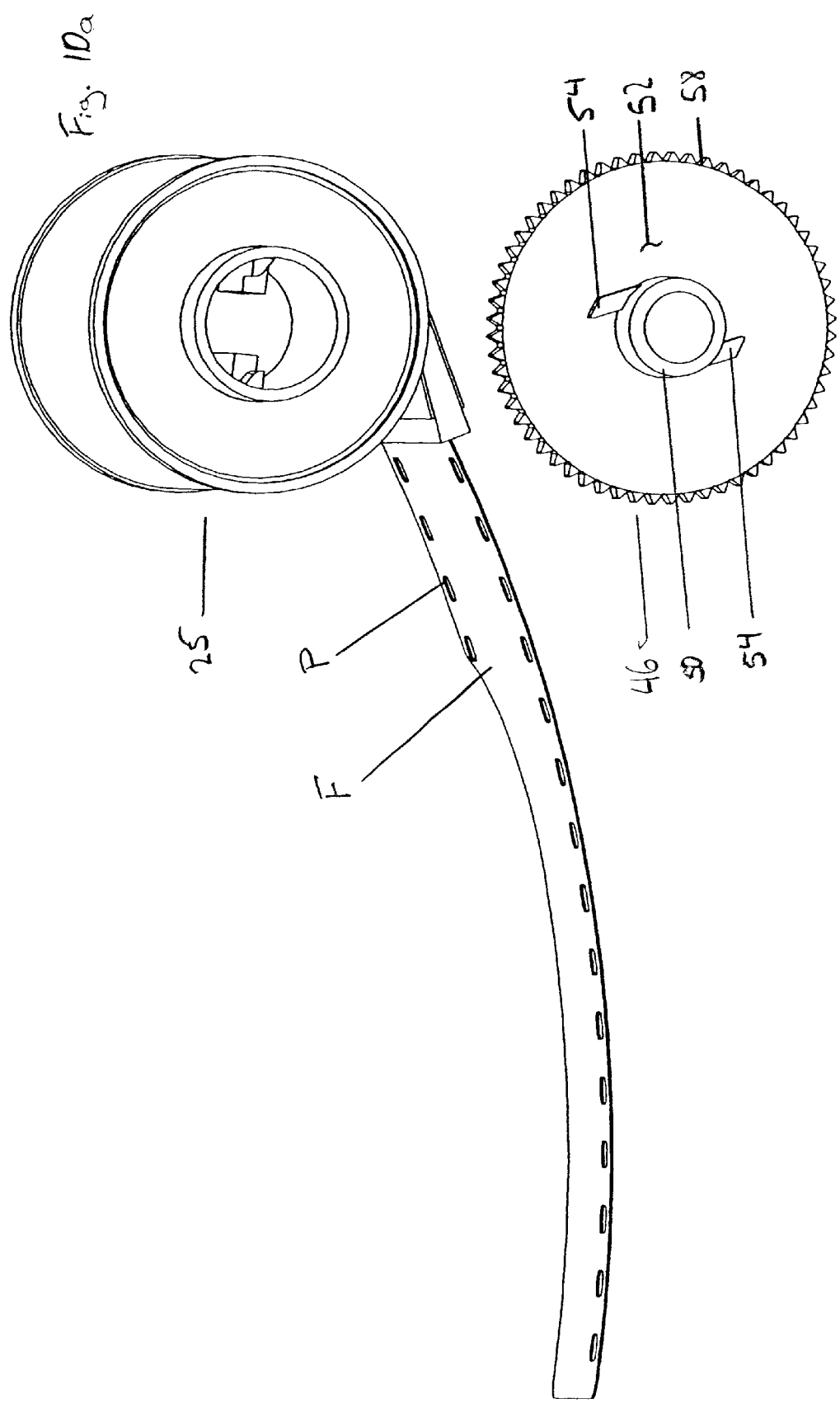

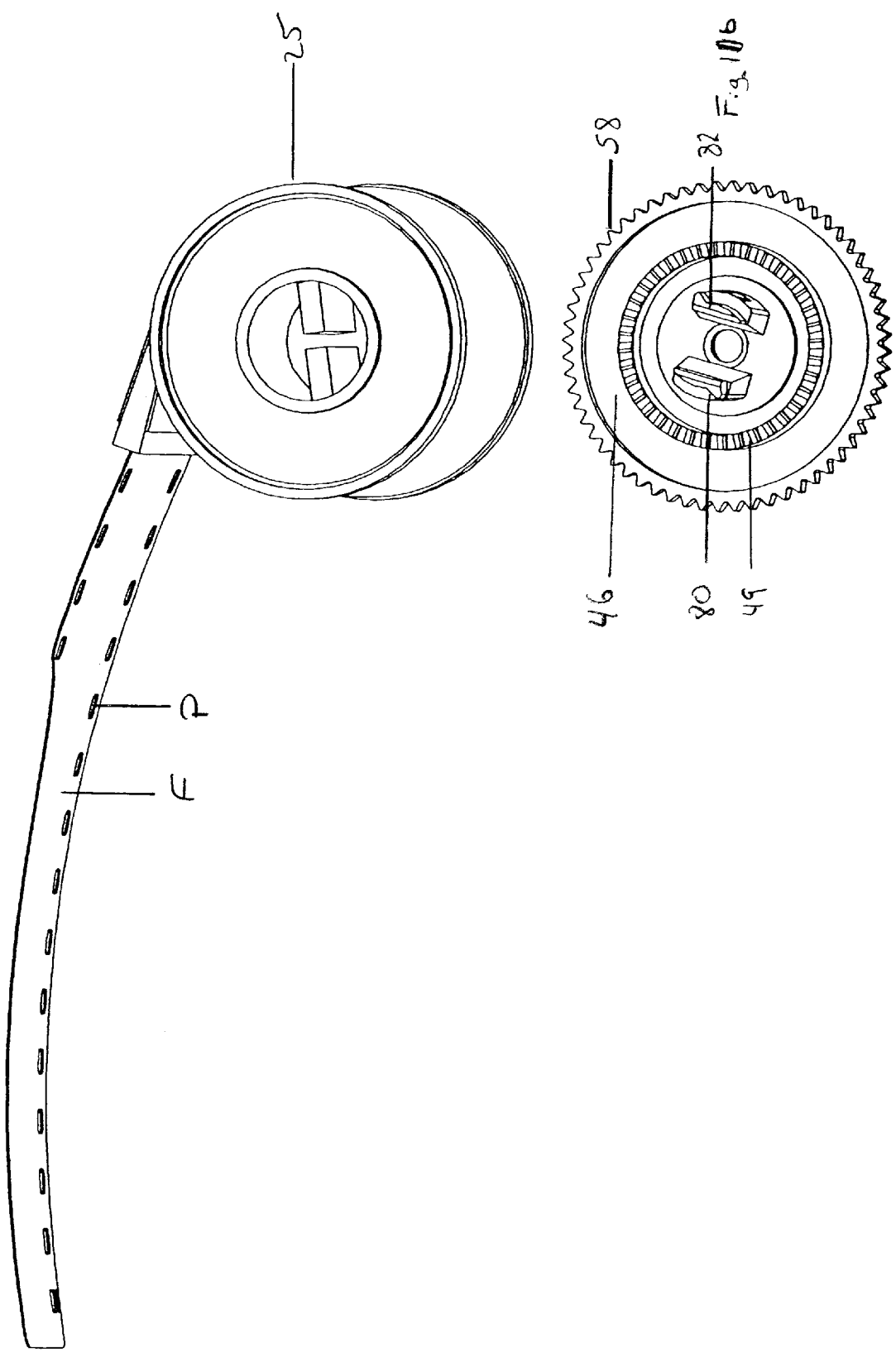

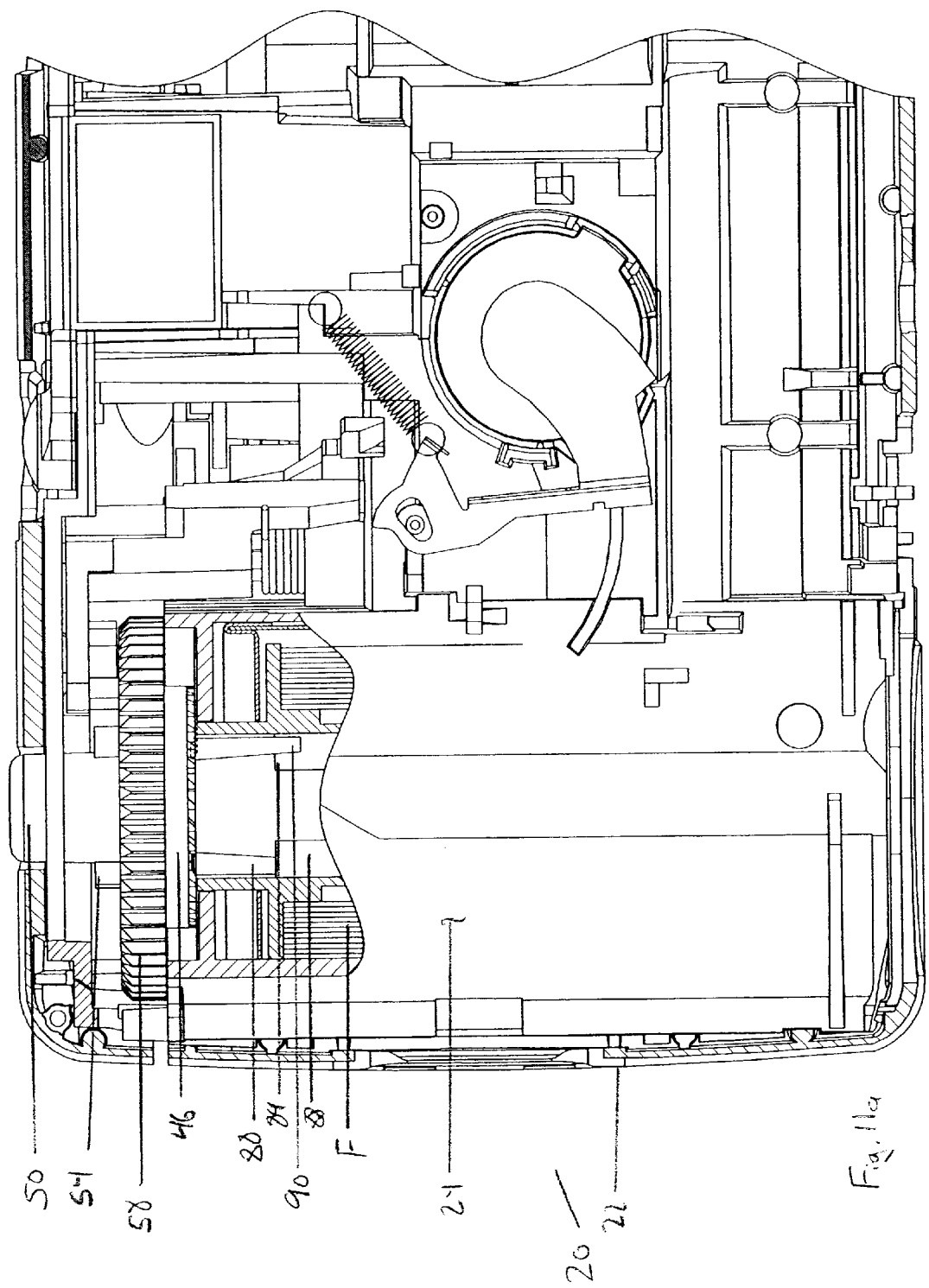

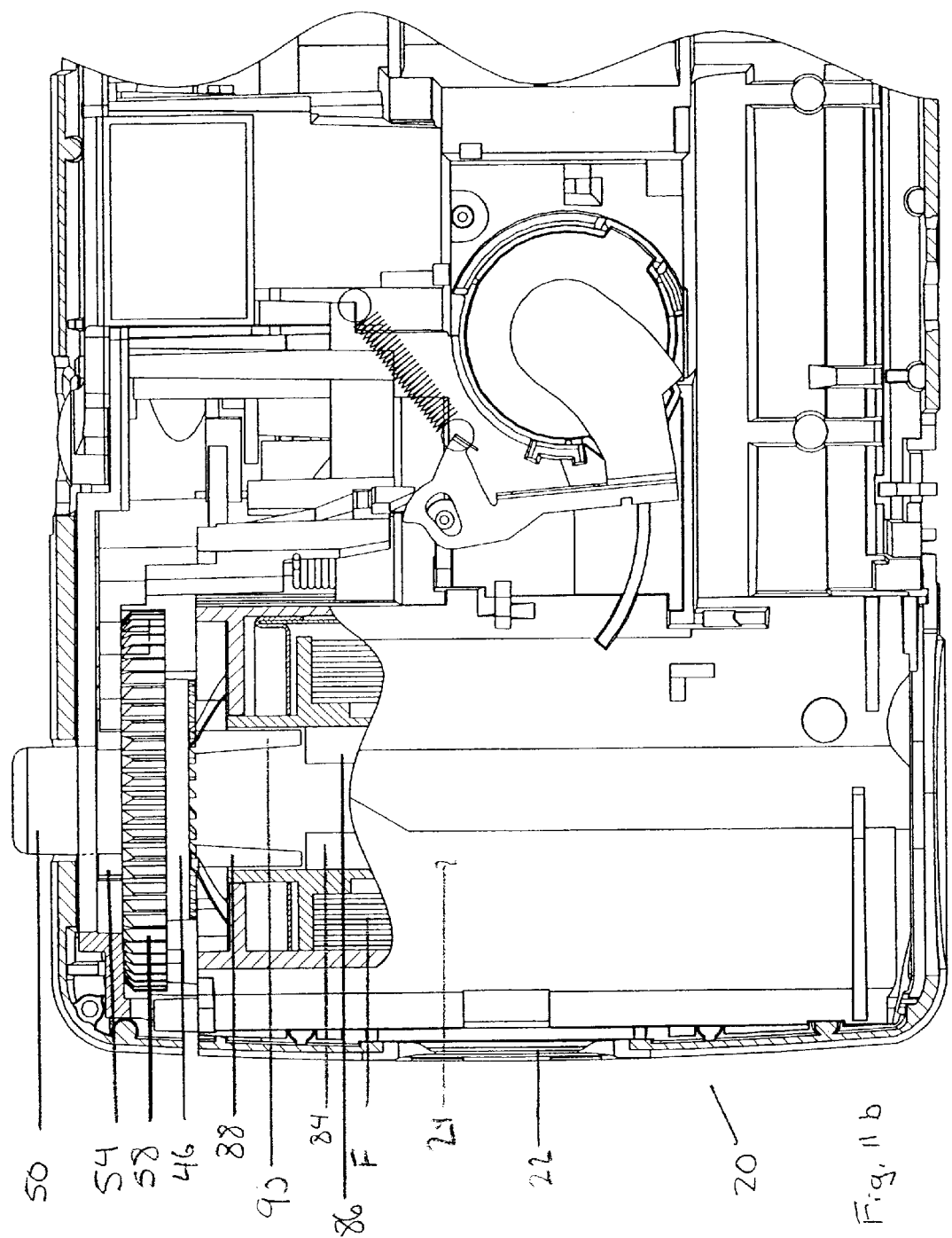

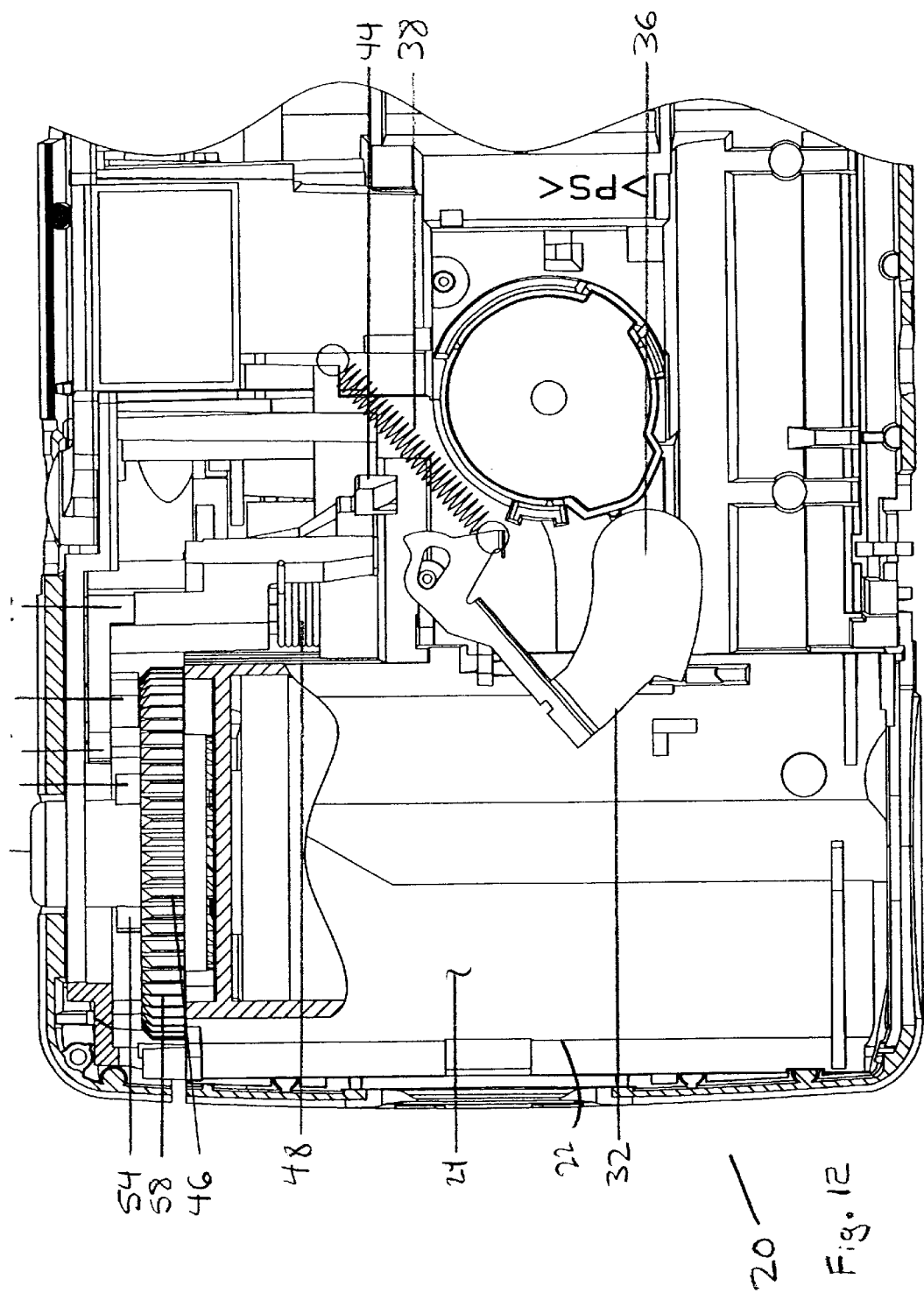

SIMPLIFIED SHUTTER RELEASE ASSEMBLY AND CAMERA HAVING SAME

FIELD OF THE INVENTION

The present invention relates to a photographic camera having a shutter release mechanism.

BACKGROUND OF THE INVENTION

Photographic cameras that record images on a perforated strip of photosensitive film are well known. Examples of such cameras include single lens reflex cameras (SLR), so-called "point and shoot" cameras and recyclable cameras such as the Kodak MaxHQ (TM) camera. Each of these cameras captures an image of a scene by focusing light from the scene to form an image at the filmstrip. A movable shutter is disposed between the scene and the filmstrip. This shutter controls the amount of light to which the film is exposed. The shutter is normally biased to a position that blocks the flow of light from the scene to the filmstrip. Exposure of the film occurs when the shutter is moved to permit light from the scene to reach the filmstrip. In certain low cost cameras, a lever is used to drive the shutter against the bias so that light can pass between the scene and the filmstrip during exposure.

To prevent inadvertent movement of the shutter between intended exposures, the bias applied to the shutter is large. Accordingly, the lever must apply a significant force to drive the shutter into the exposure position. Often this force is supplied by a resilient member. The resilient member urges the lever toward contact with the shutter. Between exposures, the lever is urged away from the shutter and potential energy is stored in the resilient member. This process is known as cocking the lever. Once that sufficient potential energy is stored in the lever, the lever is locked to prevent the inadvertent release of the stored energy. An exposure occurs when the lock on the lever is released. Accordingly, cameras incorporating such a lever must provide a mechanism for cocking the lever against the biasing force supplied by the resilient member and for locking the lever against biased motion until the time of the next exposure cycle.

Typically, in relatively inexpensive still-picture cameras, the action of winding the film is used to cock and lock the lever. During film winding, a film take-up spool is manually rotated to advance successive frames (imaging areas) of the filmstrip from a light-tight cartridge across the focal plane of a taking lens and onto the take-up spool. Each time that the take-up spool is manually rotated, an unexposed frame of the filmstrip is positioned at the focal plane of the taking lens and an exposed frame is wound onto the take-up spool. In such cameras, a cocking structure is often provided to translate a portion of the energy from the winding operation to cock the lever. A locking structure is provided to hold the lever in the cocked position. The user releases the lock to initiate an exposure.

In the prior art, various structures have been used for the purpose of cocking and locking a lever during film winding and for releasing the lever during exposure. Examples of such prior art structures are shown in U.S. Pat. Nos. 3,394,643, 3,633,477, 3,673,941, 4,681,416 and 4,949,111. These structures while effective for their purpose are complex and a more simplified structure is preferred for use in less expensive, lightweight and recyclable cameras.

As is described in U.S. Pat. No. 3,906,570 one way to simplify the structures used to cock and lock the lever is to use the film strip in the cocking and locking the lever. An attendant risk with such a system is that the film will be damaged by the forces that it is required to convey in such use. Further, there is a risk that when the lever lock is released, the film will react by moving slightly. This causes the film to move at exactly the same time as the exposure resulting in a blurred image. The '530 patent and 450 application shows a simplified structure that is intended to resolve this problem. However, what is still needed is a more simplified structure for integrating the winding operation with the cocking and locking operations. What is also needed is a simplified structure that performs cocking and locking functions and that further integrates a structure for releasing the lock.

SUMMARY OF THE INVENTION

The invention relates to a shutter release apparatus for use in a camera for capturing images on a perforated film. The shutter release apparatus has a rotatable thumb wheel movable along an axis between a start position and a trigger position. A sprocket is provided having teeth to engage perforations on the film and to move therewith during film winding. A biased lever is moved by the sprocket against the bias from a position holding the thumb wheel in the start position to a position releasing the thumb wheel for urged movement into the trigger position. The thumb wheel blocks biased movement of the lever when the thumb wheel is in the trigger position and movement of the thumb wheel from the trigger position to the start position releases the lever for biased movement to drive the shutter to expose the film.

In another aspect, a shutter release apparatus is provided for use in a camera for capturing images on a perforated film, the apparatus has a rotatable thumb wheel urged for movement between a start position and a trigger position. A sprocket is provided having teeth for engagement with perforations on the film and movement therewith during film winding. A biased lever holds the thumb wheel in the start position and is moved against the bias by movement of the sprocket to a position permitting the thumb wheel to move into the trigger position. The lever further defines a catch positioned to block movement of the sprocket when the film is advanced by a predetermined amount. Rotation of the thumb wheel in the trigger position further moves the lever against the bias. Movement of the thumb wheel from the trigger position to the start position releases the lever for biased movement to drive the shutter to expose the film.

BRIEF DESCRIPTION OF THE DRAWINGS

FIG. 4a shows a top view of the camera of the embodiment of FIG. 1 at the start of the film winding;

FIG. 5 shows a top view of the camera of the embodiment of FIG. 1 at the start of the lever cocking process;

FIG. 8b shows a top left isometric view of the lever and the thumb wheel at the end of the second phase of the cocking process with a button cut away from the thumb wheel;

FIG. 10a shows a top view of a film spool and a thumb wheel having integrated clutch features;

FIG. 10b shows a bottom view of the film spool and thumb wheel of FIG. 10a;

FIG. 11a shows a schematic diagram of an alternative embodiment of the shutter release mechanism of the present invention wherein no clutch is used and wherein the thumb wheel directly engages the film spool when in the start position; and FIG. 11b shows a shutter release mechanism of FIG. 11a with the thumb wheel in the trigger position and disengaged with the film spool.

FIG. 12 shows the camera of the present invention during exposure.

DETAILED DESCRIPTION OF THE INVENTION

Figure 1:
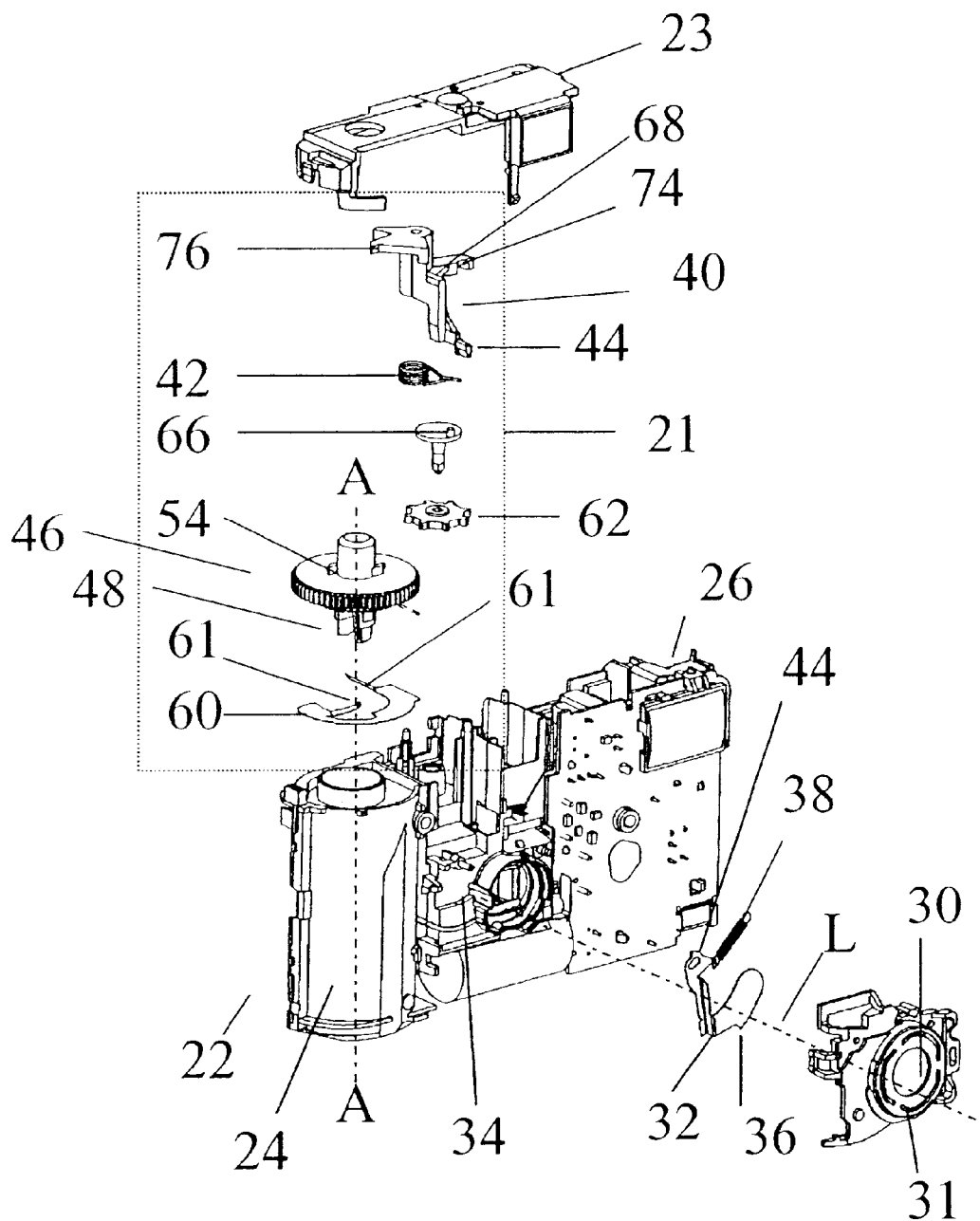
FIG. 1 shows an assembly view of a camera having one embodiment of a shutter release mechanism in accordance with the present invention.
Figure 2:
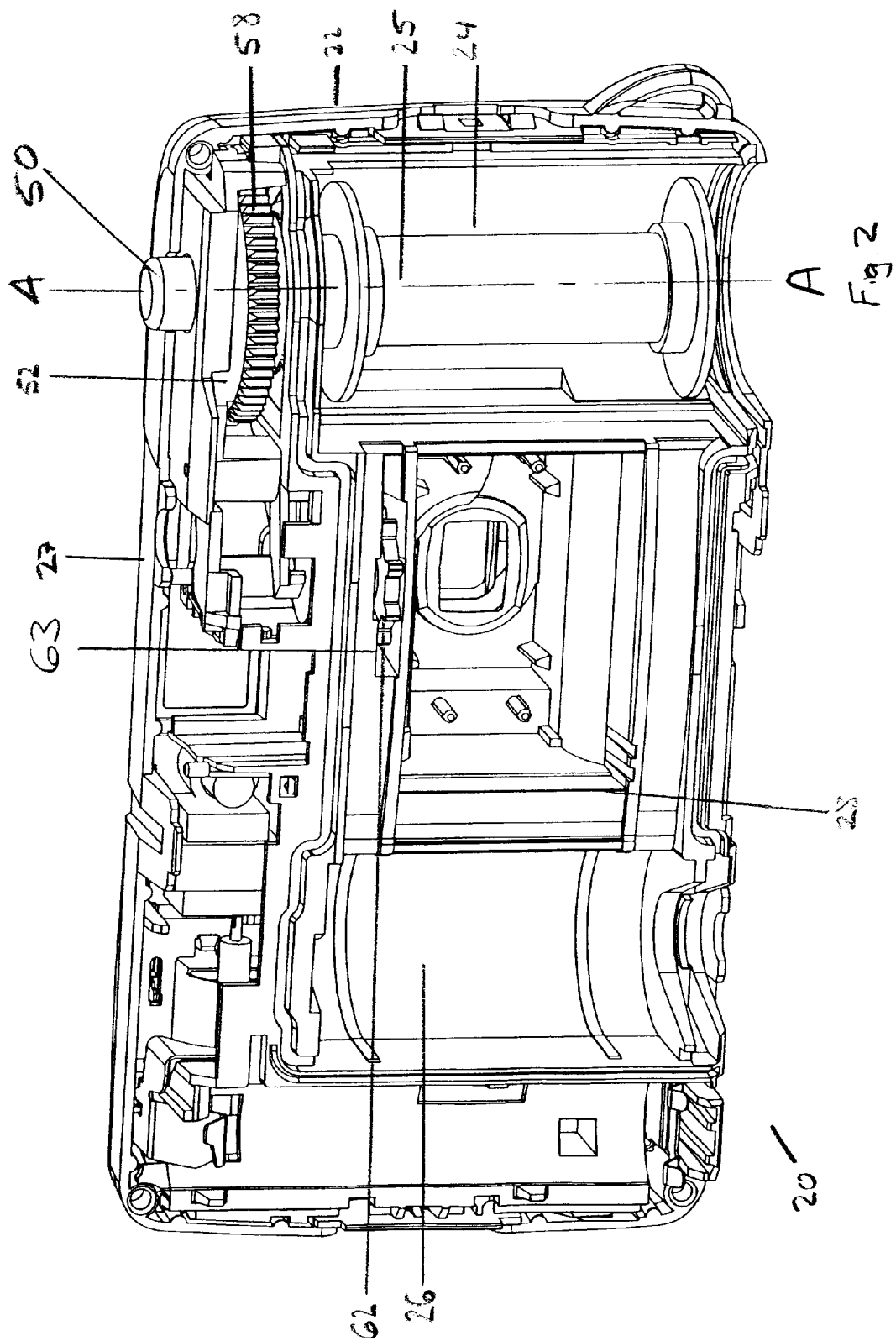
FIG. 2 shows a back view of the camera of the embodiment of FIG. 1.
Figure 3:
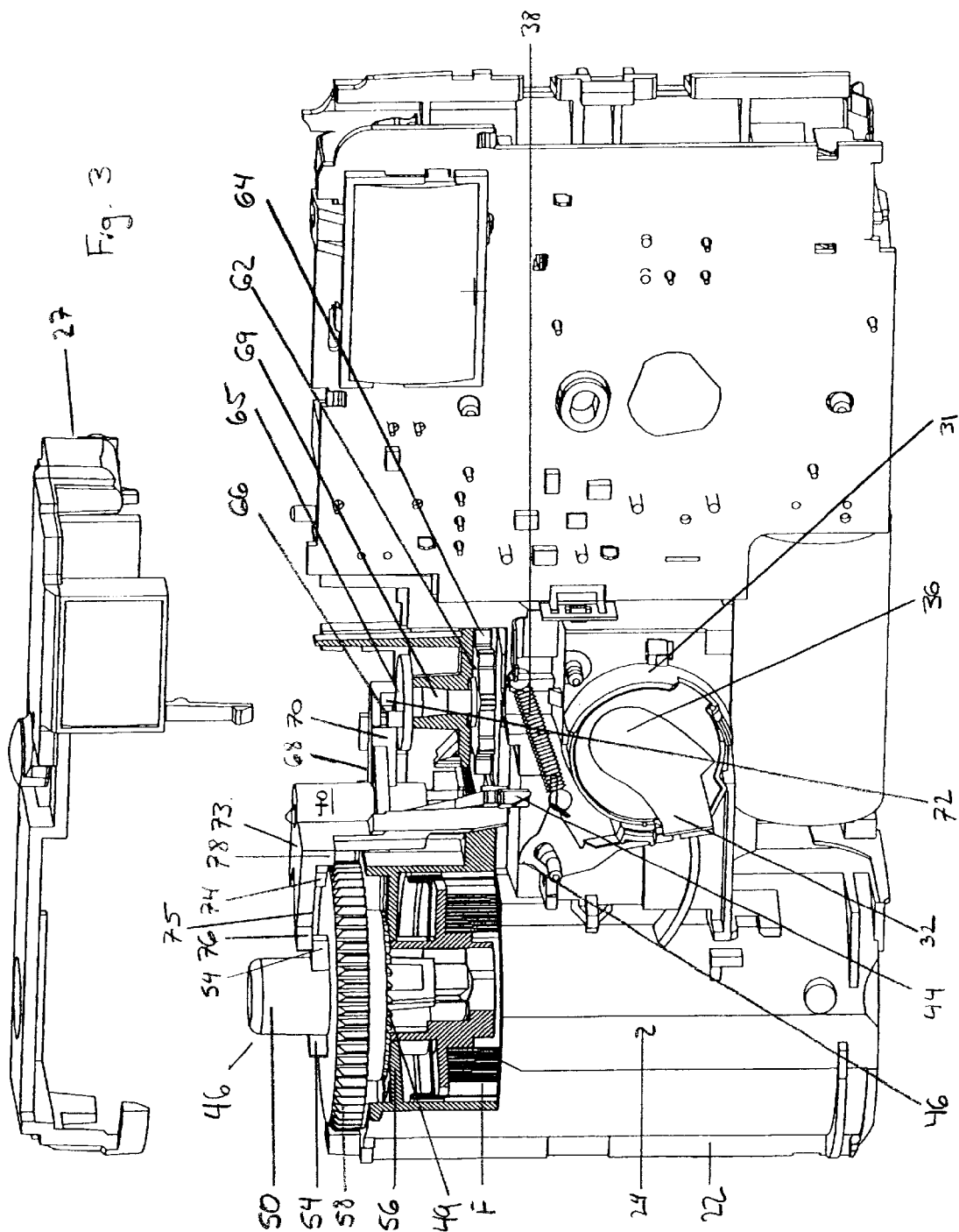
FIG. 3 shows a front view of the camera of the embodiment of FIG. 1 at the start of film winding.
Figure 4B:
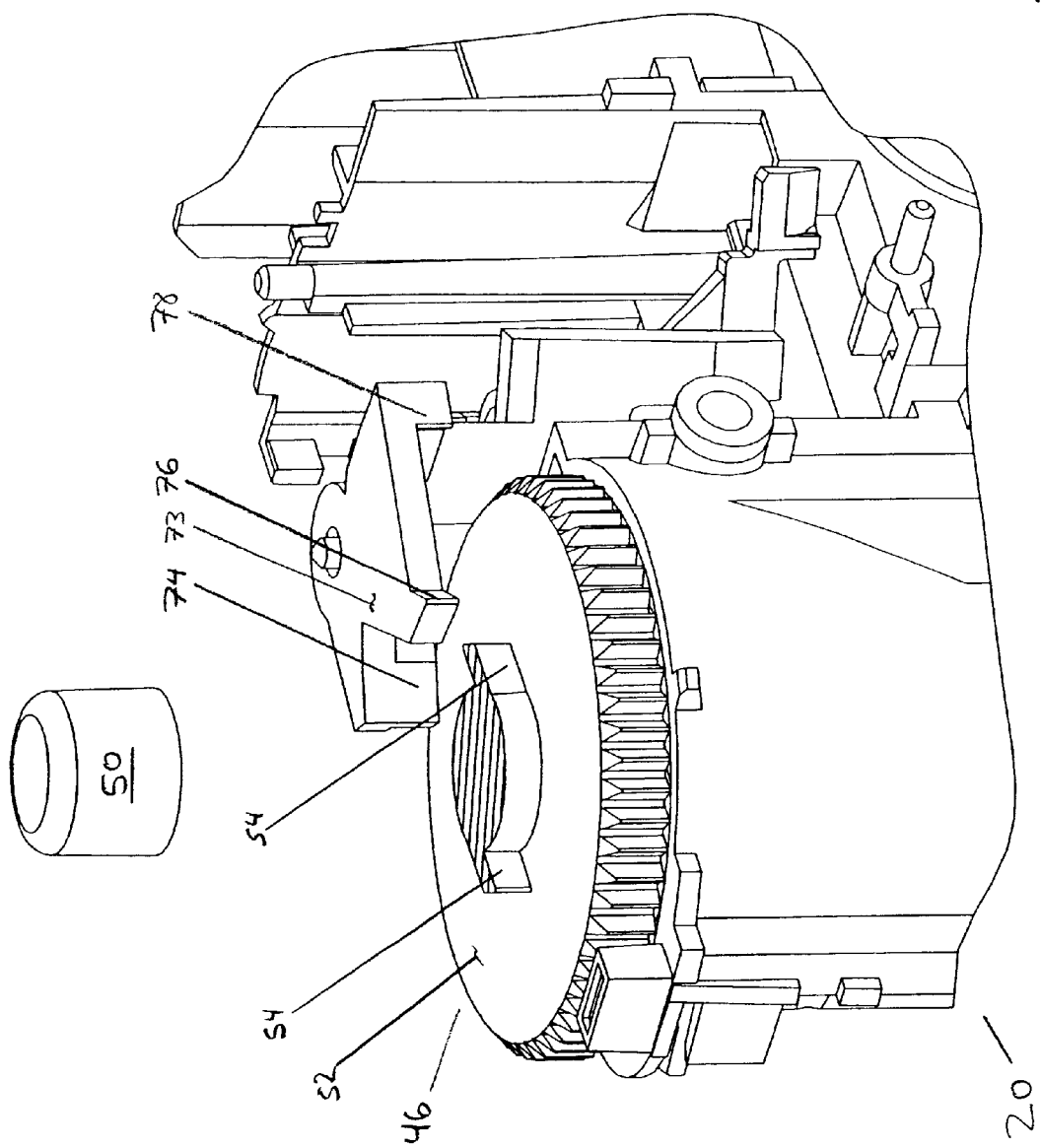
FIG. 4b shows a top left isometric view of the lever and the thumb wheel in the start position with a button cut away from the thumb wheel.

The present invention will be directed, in particular, to elements forming part of, or cooperating more directly with, an apparatus in accordance with the present invention. It is to be understood that elements not specifically shown or described may take various forms that are well known to those skilled in the art.

FIGS. 1, 2, 3 and 4 show, respectively a front assembly view, a back view, a front view, and a top view of a camera 20 having a shutter release apparatus 21 of the present invention with an outer body (not shown).

As is shown in FIGS. 1, 2, 3, 4a and 4b, camera 20 comprises a camera body 22 and keeper plate 23. Camera body 22 defines a film take-up spool area 24, a film take up spool 25 and a film supply chamber 26. Film F can be contained in a film cartridge (not shown) or other film storage structure (not shown). Such a cartridge or other structure is housed in film supply chamber 26. Film F is wound onto film take up spool 25 and then rewound into the film cartridge when it is desired to remove film F from camera 20. In the embodiment that is shown in FIGS. 1, 2, 3, 4a and 4b, film is stored without a housing in the film supply chamber 26. A leading edge of film F is drawn from the supply chamber 26 and into film take-up spool area 24 where it is attached to film take-up spool 25. Rotation of film take-up spool 25 winds film F about film take-up spool 25 and draws film F from storage in film supply chamber 26. This latter approach is commonly used in recyclable cameras.

Lens 30 is mounted in baffle 31 and positioned between film supply chamber 26 and film take-up spool area 24. Light from a photographic scene passes through lens 30 and travels generally along light path L to form an image on film F at a film plane 28. A shutter 32 is interposed between lens 30 and film plane 28. In the embodiment that is shown, shutter 32 is pivotally mounted about shaft 34 which is a feature of camera body 22. Shutter 32 has a light blocking surface 36 and is pivotally movable between a first position wherein light blocking surface 36 is positioned to block light path L and a second position wherein light blocking surface 36 is removed from light path L. To prevent unintended exposure, shutter 32 is biased into the first position by a first resilient member 38.

To capture an image on film F, shutter 32 is rapidly moved through an exposure cycle beginning in the first position, travelling to the second position and ending in the first position. This exposure cycle must occur within a fraction of a second. To accomplish this, a lever 40 is used to accelerate shutter 32 through the exposure cycle. In the embodiment shown in FIG. 1, lever 40 is pivotally mounted to camera body 22. Lever 40 has a contact surface 44. Lever 40 is pivotably movable so that when lever 40 is rotated in a counter-clockwise direction, contact surface 44 impacts a shutter contact 46 This impact causes shutter 32 to pivot in a clockwise fashion about shaft 34, thereby removing light blocking surface 36 from light path L to expose the film at the film plane 28 to light from the scene. The exposure cycle is completed as the shutter 32 is returned to the first position by first resilient member 38.

Lever 40 is biased by a second resilient member 42 which urges lever 40 in a counter-clockwise direction. Between exposures, potential energy is stored in second resilient member 42 by moving lever 40 in a clockwise direction and locking lever 40 in a rotated position. The next exposure cycle is initiated by when lever 40 is released from the lock. This, in turn releases the potential energy that is stored in second resilient member 40 accelerating lever 40 for movement in the clockwise direction.

It will be appreciated that it is necessary to cock lever 40 between exposures so that sufficient potential energy is stored in second resilient member 42 to overcome the bias supplied by first resilient member 38 and that it is also necessary to lock lever 40 in place until the time of the next exposure. It is also necessary to advance film F between exposures. The process by which film F is advanced will now be described with reference to FIGS. 1, 2, 3, 4a and 4b. Thumb wheel 46 is mounted on a shoulder 56 formed in camera body 22 for rotation about an axis of rotation A—A. Thumb wheel 46 is vertically slidable along axis A—A between a start position (shown in FIGS. 1, 2, 3, 4a and 4b) and a trigger position. Thumb wheel 46 is biased away from the start position toward the trigger position by a third biasing member 60.

In the embodiment shown, third biasing member 60 is a spring with links 61 that engage downwardly facing teeth 49 of thumb wheel 46. Third biasing member 60 biases thumb wheel 46 toward the trigger position. Links 61 are biased to bear against the teeth 49 and are arranged to elastically bend in a downward direction permitting teeth 49 to pass over links 61 when thumb wheel 46 is turned in a direction that winds film F. However, links 61 do not bend downward when thumb wheel 46 is to be rotated in a direction that unwinds film F, instead links 61 engage teeth 49 to prevent rotation of thumb wheel 46 in this direction.

Alternatively, third biasing member 60 can take other forms. In particular thumb wheel 46, shoulder 56, and clutch 48 can each be adapted with a resilient features (not shown) to bias thumb wheel 46 from the start position toward the trigger position.

Thumb wheel 46 is connected to film take-up spool 25 using an optional clutch 48. When thumb wheel 46 is rotated by the user of camera 20, clutch 48 links mechanical rotation of thumb wheel 46 to film take-up spool 25, to rotate film take-up spool 25. This draws film F from film storage area 26 across film plane 28, into film take-up spool area 24. An optional knurled surface 58 is shown on thumb wheel 46 to provide easy engagement and gripping between thumb wheel 46 and a thumb or other digit of the user of camera 20.

A sprocket 62 having teeth 64 is pivotally mounted to camera body 22. Sprocket 62 is arranged so that teeth 64 engage perforations P on film F as film F passes between film storage area 26 and film take-up spool area 24. Sprocket 62 is connected to a pin support plate 65 by way of an extension 69. Pin support plate 65 and extension 69 are rotated by rotation of sprocket 62. A drive pin 66 is fixed on pin support plate 65 and rotates therewith. In this way, winding of film F causes sprocket 62 and drive pin 66 to rotate. Extension 69 is optional and is used in the embodiment shown to permit vertical separation between the vertical position of sprocket 62 and the vertical position of drive pin 66.

As is shown in FIGS. 1, 2, 3, 4*a* and 4*b*, lever 40 is positioned between sprocket 62 and thumb wheel 46. Lever 40 is also pivotally connected to camera body 22. In addition to the features described above, lever 40 has a drive arm 68 with a drive lug 70, a drive gap 71 and stop lug 72. Drive lug 70, drive gap 71 and stop lug 72 are positioned within the rotational path of drive pin 66 so that drive pin 66 can engage drive lug 70 and stop lug 72.

Lever 40 also has a stop arm 73, with a spacer 74 downwardly depending from a slide surface 75, a trigger block 76 and a stop 78. The spacer 74 and slide surface 75 are arranged to engage top surface 52 of thumb wheel 46. Spacer 74 engages top surface 52 to block thumb wheel 46 from biased movement from the start position (FIGS. 4*a* and 4*b*) to the trigger position. Slide surface 75 engages top surface 52 of thumb wheel 46 when thumb wheel 46 is in the trigger position.

Lever 40 is pivotable between positions wherein spacer 74 engages top surface 52 to hold thumb wheel 46 in the start position and positions where spacer 74 separates from top surface 52 permitting thumb wheel 46 to move from the start position to the trigger position. In the embodiment shown, lever 40 is positioned to hold thumb wheel 46 in the start position while film F is moved by the fixed amount. However, as is shown in FIG. 5, drive pin 66 rotates into contact with drive lug 70 of lever 40, when the film F has been advanced by a predetermined length. Contact between drive lug 70 and drive pin 66 defines the start of the first phase of the lever cocking process. Further winding of film F causes driver pin 66 to move against drive lug 70 thus rotating lever 40 in a clockwise direction. This rotation of lever 40 stores potential energy in second resilient member 42. This rotation of lever 40 also causes spacer 74 to move toward the edge of top surface 52 of thumb wheel 46.

Figure 6:
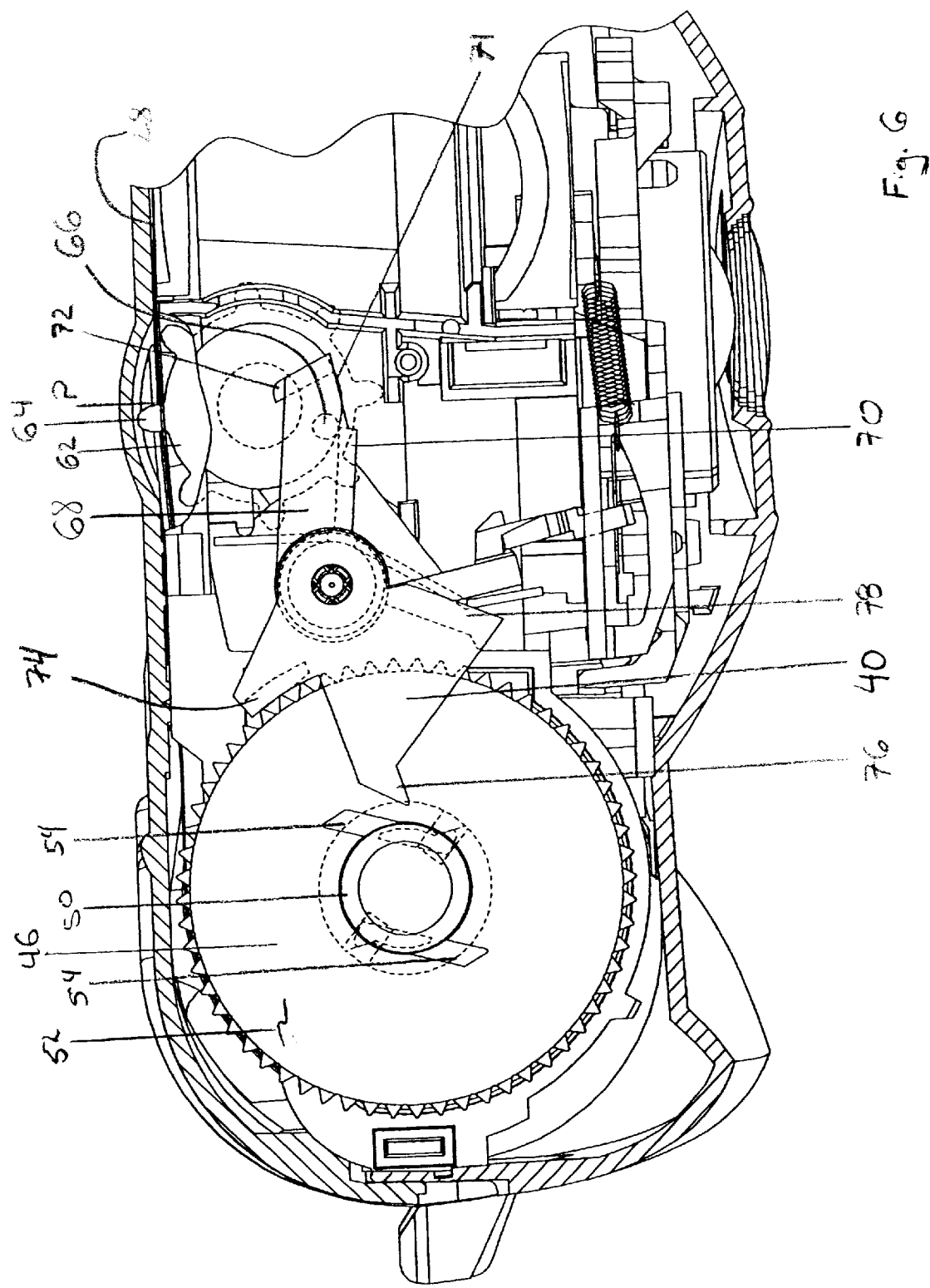
FIG. 6 shows a top view of the camera of the embodiment of FIG. 1 at the end of the first phase of the cocking process.

Rotation of lever 40 continues until the point shown in FIG. 6 which shows the end of the first phase of cocking. Further, rotation beyond this point drives spacer 74 off of top surface 52 and beyond knurled surface 58 so that spacer 74 separates from thumb wheel top surface 52.

Figure 7A:
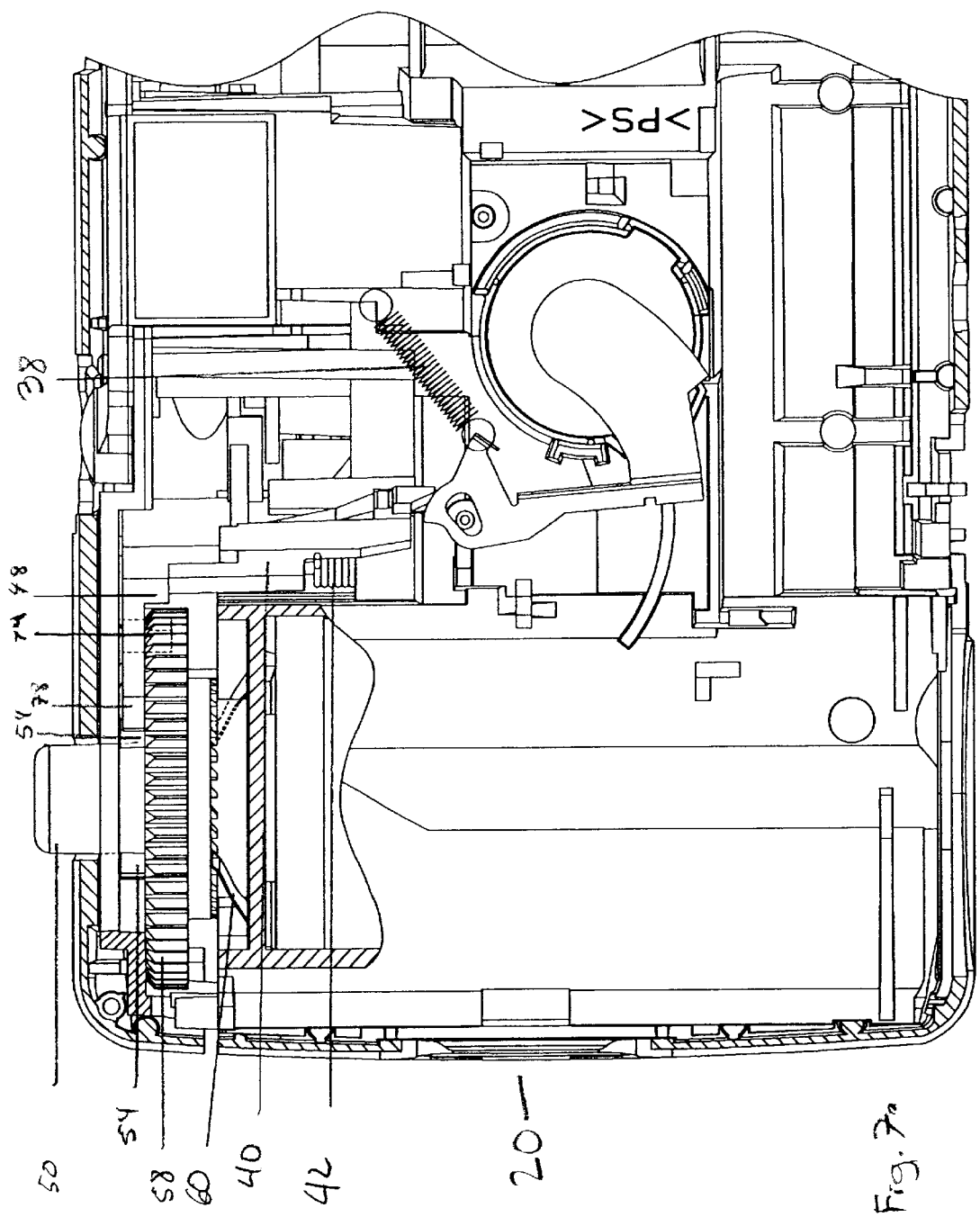
FIG. 7a shows a front view of the camera of the embodiment of FIG. 1 at the start of the second phase of the cocking process.
Figure 7B:
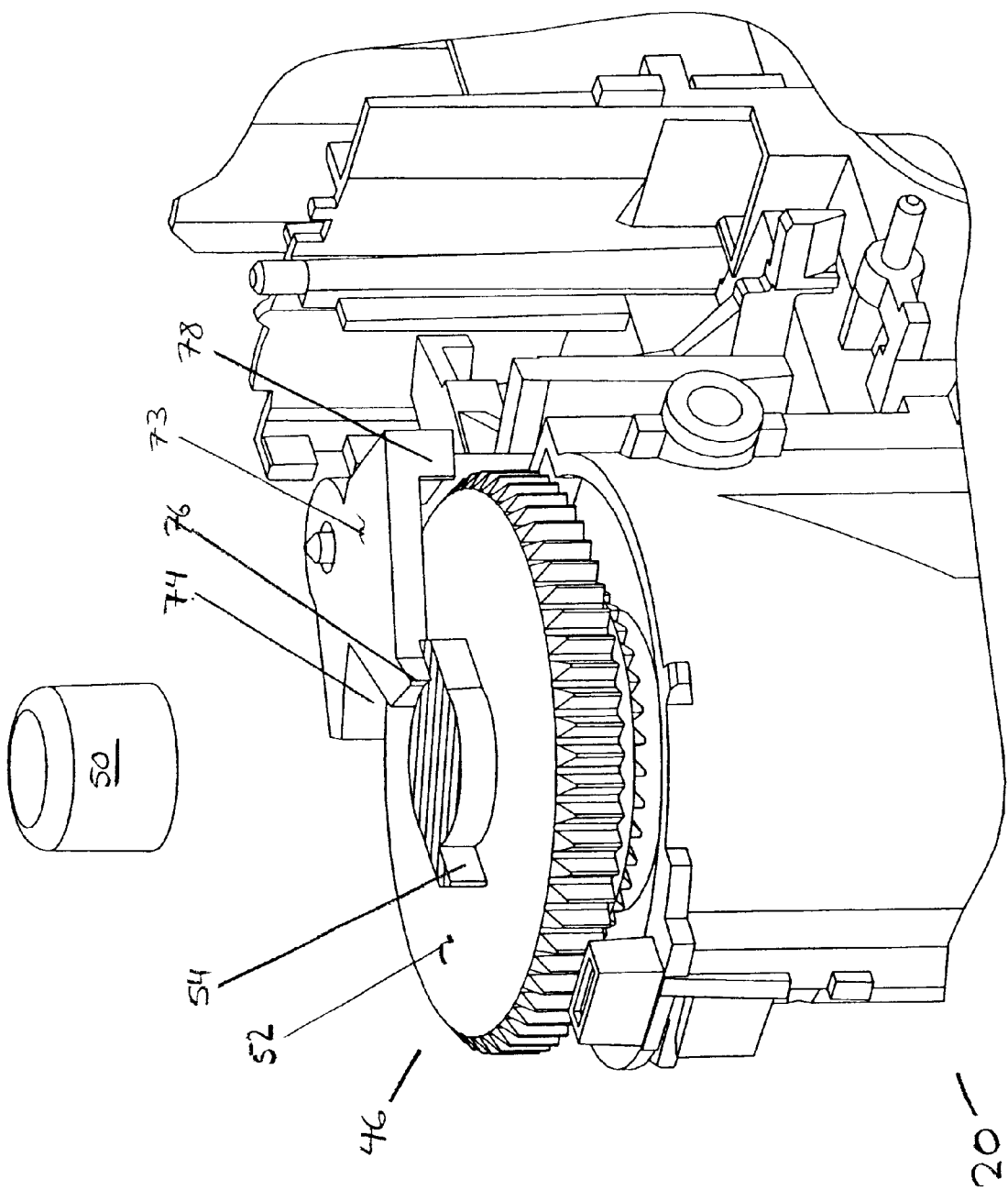
FIG. 7b shows a top left isometric view of the lever and the thumb wheel at the start of the second phase of the cocking process with a button cut away from the thumb wheel.

As is shown in FIGS. 7*a* and 7*b*, when spacer 74 separates from top surface 52, thumb wheel 46 is released for biased movement move from the start position to the trigger position. This biased movement of thumb wheel 46 brings slide surface 75 into engagement with top surface 52 of thumb wheel 46. At the point at which thumb wheel 46 is permitted to move into the trigger position, drive pin 66 separates from drive lug 70 and passes through drive gap 71.

This separation means that film F is no longer used to resist the release of the potential energy that is stored in second resilient member 42 rotation of lever 40. Instead, knurled surface 58 is positioned in the same vertical plane as spacer 74 and is positioned so that it blocks counter-clockwise rotation of spacer 74. This completes the first phase of the cocking process.

A second phase of the cocking process begins as thumb wheel 46 is further rotated and in the trigger position shown in FIGS. 7*a* and 7*b*. It will be observed that when thumb wheel 46 is in this position, a trigger block 76 on lever 40 is now in the same vertical plane and in the rotational path of projections 54 which project radially along top surface 52 of thumb wheel 46. Accordingly, rotation of thumb wheel 46 in the trigger position brings projections 54 into contact with trigger block 76. It will be appreciated that, further rotation of thumb wheel 46 after projections 54 contact trigger block 76 causes further rotation of lever 40 against the urging force of second resilient member 42. This stores additional potential energy in second resilient member 42 without requiring the use of film F.

Figure 8A:
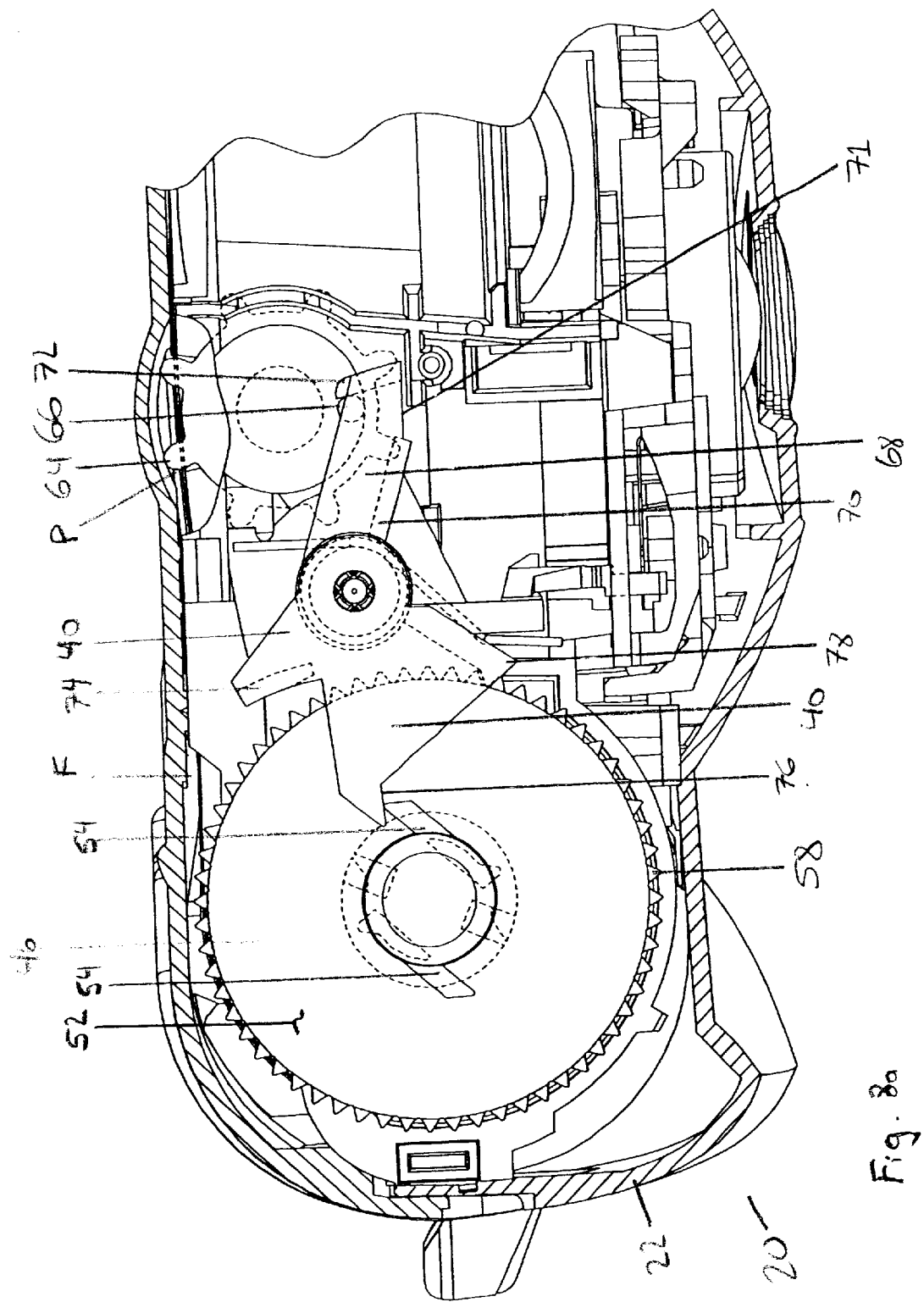
FIG. 8a shows a top view of the camera of the embodiment of FIG. 1 at the end of the end of the second phase of the cocking process.
Figure 9:
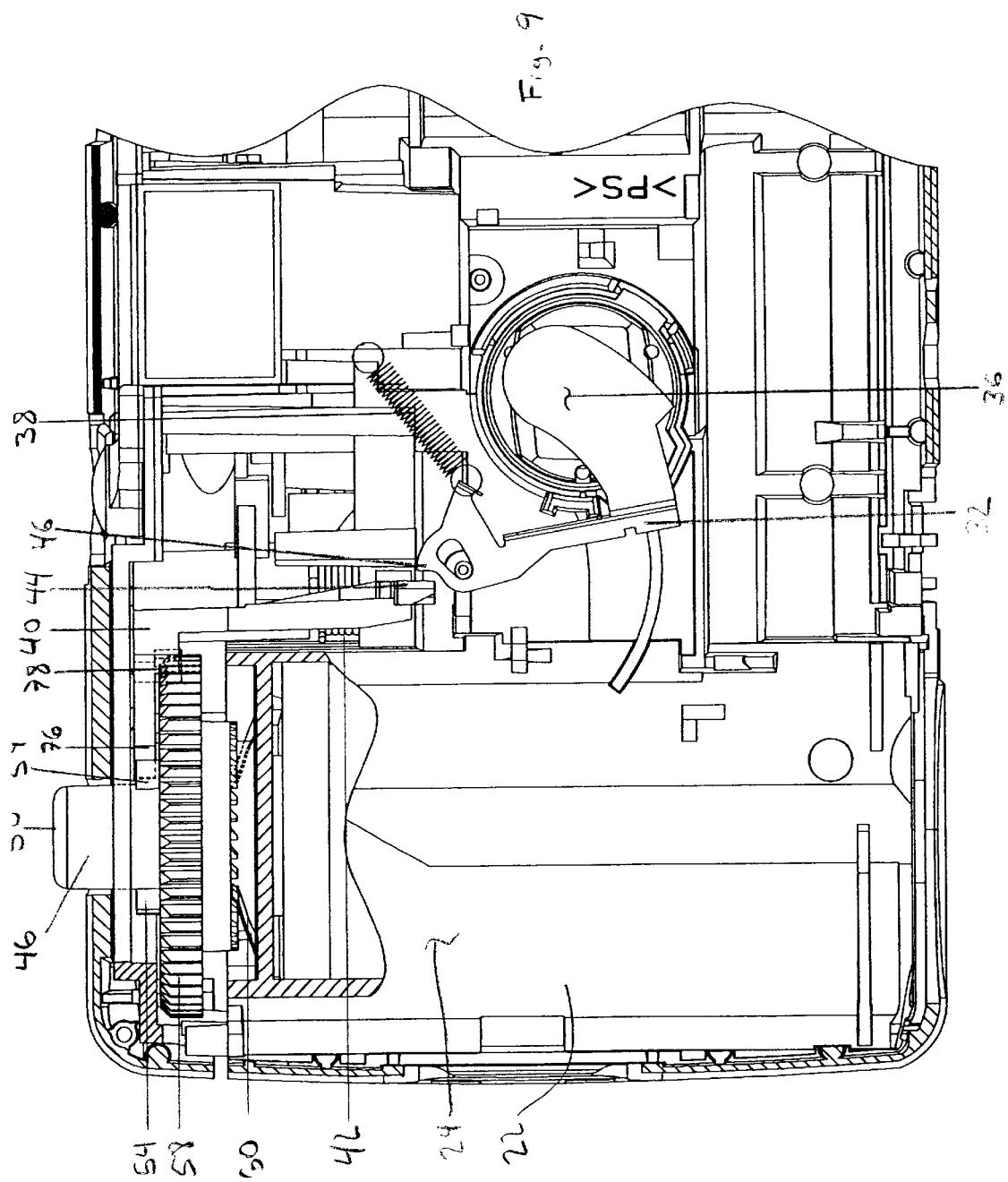
FIG. 9 shows a front view of the camera of FIG. 1 at the end of the second phase cocking process.

As is shown in FIGS. 8*a*, 8*b* and 9, a stop 78 is used to limit the maximum degree to which lever 40 can be rotated in the clockwise direction. In this regard, stop 78 downwardly depends from slide surface 75 and extends into the same vertical plane as knurled surface 58 of thumb wheel 46. As thumb wheel 46 and lever 40 mutually rotate, knurled surface 58 of thumb wheel 46 confronts stop 78 which prevents further rotation of lever 40. This defines an ultimate limit on the potential energy that can be stored in second resilient member 42.

Because movement of film F in the present invention is actuated by manual rotation of thumb wheel 46 it is necessary to provide a structure to prevent mis-metering of film F. In the embodiment shown, movement of film F between exposures is metered by engagement of drive pin 66 with stop lug 72 of lever 40. In this regard, it will be recalled that drive pin 66 passes into drive gap 71 after drive pin 66 separates from drive lug 70. However, drive pin 66 continues to rotate as thumb wheel 46 is rotated. This rotation brings drive pin 66 into contact with stop lug 72 of lever 40. When this contact occurs, drive pin 66 can no longer rotate. This prevents sprocket 62 from rotating which, in turn, prevents film F from moving.

As is shown in FIGS. 8 and 9, the engagement between stop lug 72 and drive pin 66 may occur at a point wherein lever 40 is not fully biased. In such a circumstance, sprocket 62 prevents motion of film F, however, it is still necessary to rotate thumb wheel 46 to complete the second phase of the cocking process. Clutch 48 is used to permit rotation of thumb wheel 46 when sprocket 62 blocks film F from further advance.

In the embodiment shown in FIGS. 10*a* and 10*b*, clutch 48 is formed from clutch features 80 and 82, that are integrated into thumb wheel 46. Clutch features 80 and 82 engage turn blocks 84 and 86 to rotate film take up spool 25 during winding. Clutch features 80 and 82 are shaped to deform and slip past turn blocks 84 and 86 when film take up spool 25 cannot move because film F cannot be advanced. In the embodiment shown, turn blocks 84 and 86 are also shaped to facilitate clutching engagement with clutch features 80 and 82. This permits relative motion of thumb wheel 46 with respect to film F without imposing a risk of damage to film F. It will be appreciated that other conventional clutching arrangements can be used.

In an alternative embodiment shown in FIGS. 11*a* and 11*a*, clutch 48 is not used. In this embodiment, thumb wheel 46 defines a pair of prongs 88 and 90 to engage turn blocks 84 and 86 on film take-up spool 25. Prongs 88 and 90, however, have a defined length that is long enough to engage turn blocks 84 and 86 when thumb wheel 46 is in the start position. However, prongs 88 and 90 do not have sufficient length to engage turn blocks 84 and 86 when thumb wheel 46 is in the trigger position. Accordingly, in such an embodiment, lever 40 does not need to contain a stop lug 72 and clutch features 80 and 82 can be omitted.

As is shown in FIG. 12, to initiate an exposure, button 50 is depressed from the trigger position to the start position. This separates lever 40 from engagement with projection 54 and knurled surface 58, and allows lever 40 to move with bias provided by second resilient member 42, to initiate an exposure cycle.

The invention has been described in detail with particular reference to certain preferred embodiments thereof, but it will be understood that variations and modifications can be effected within the spirit and scope of the invention.

PARTS LIST 20 camera
21 shutter release apparatus
22 camera body
23 keeper plate
24 film take-up spool area
25 film take-up spool
26 film supply chamber
28 film plane
30 lens
31 baffle
32 shutter
34 shaft
36 light blocking surface
38 first resilient member
40 high energy lever
42 second resilient member
44 contact surface
45 shutter contact
46 thumb wheel
48 clutch
49 teeth
50 button
52 top surface of thumb wheel
54 projections
56 shoulder
58 knurled surface
60 third biasing member
61 biasing links
62 sprocket
64 teeth
66 drive pin
68 drive arm
70 drive lug
71 drive gap
72 stop lug
73 stop arm
74 spacer
75 slide surface
76 trigger block
78 stop
80 clutch
82 clutch
84 turn block
86 turn block
88 prong
90 prong
F Film
L light path
P Perforation

What is claimed is:

1. A shutter release apparatus for use in a camera for capturing images on a perforated film, the shutter release apparatus comprising:
a rotatable thumb wheel movable along an axis between a start position and a trigger position;
a sprocket having teeth to engage perforations on the film and to move therewith during film winding; and
a biased lever moved by the sprocket against the bias from a position holding the thumb wheel in the start position to a position releasing the thumb wheel for urged movement into the trigger position;
wherein the thumb wheel blocks biased movement of the lever when the thumb wheel is in the trigger position and movement of the thumb wheel from the trigger position to the start position releases the lever for biased movement to drive the shutter to expose the film.

2. The shutter release apparatus of claim 1, wherein rotation of the thumb wheel in the trigger position further drives the lever against the bias.

3. The shutter release apparatus of claim 1, wherein the lever further comprises a stop to limit the movement of the lever against the bias.

4. The shutter release apparatus of claim 3, wherein sprocket defines a catch that engages the stop to limit the movement of the lever against the bias.

5. The shutter release apparatus of claim 4, wherein the camera further defines a camera body and said camera body defines a catch that engages the stop to limit movement of the lever against the bias.

6. The apparatus of claim 1 further comprising a film frame counter for counting film frames on a roll of film wherein said film frame counter comprises a movable indicator and wherein said sprocket has a counter advancement surface to incrementally advance the film frame counter as the film is wound.

7. The apparatus of claim 1 wherein said thumb wheel comprises a button projecting axially above the thumb wheel.

8. A shutter release apparatus for use in a camera for capturing images on a perforated film, the shutter release apparatus comprising:
a rotatable thumb wheel urged for movement between a start position and a trigger position;
a sprocket having a film engagement surface for engagement with the perforations and movement therewith during film winding; and
a biased lever holding the thumb wheel in the start position is moved against the bias by movement of the sprocket to a position permitting the thumb wheel to move into the trigger position, said lever further defining a catch positioned to block movement of the sprocket when the film is advanced by a predetermined amount;

wherein rotation of the thumb wheel in the trigger position further moves the lever against the bias and movement of the thumb wheel from the trigger position to the start position releases the lever for biased movement to drive the shutter to expose the film.

9. The shutter release apparatus of claim 8 further comprising a clutch between the thumb wheel and the film.

10. The winding apparatus of claim 9 wherein said clutch further comprises a resilient biasing member to bias the film wheel from the start position toward the trigger position.

11. The apparatus of claim 8 further comprising a biasing member biasing said sprocket against movement with the film and wherein said catch further comprises a sprocket deflection surface to separate the engagement surface from the film perforation after film winding.

12. The apparatus of claim 8 further comprising a biasing member biasing said sprocket against movement with the film and wherein the thumb wheel defines a cam to separate the engagement surface from the film perforation after film winding.

13. The apparatus of claim 8 wherein the thumb wheel further comprises teeth and the biased lever comprises at least one link to engage the teeth and to prevent motion of the thumb wheel in a direction that does not wind the film.

14. A camera for capturing images on a perforated film, the camera comprising:

a lens focusing light from a scene onto the film;

a movable shutter biased for movement from a position exposing the film to a position preventing exposure of the film;

a rotatable thumb wheel movable along an axis between a start position and a trigger position;

a sprocket having teeth to engage perforations on the film and to move therewith during film winding; and a biased lever moved by the sprocket against the bias from a position where the lever holds the thumb wheel in the start position to a position releasing the thumb wheel for urged movement into the trigger position with said lever further blocked by the thumb wheel to prevent biased movement of the lever when the thumb wheel is in the trigger position;

wherein movement of the thumb wheel from the trigger position to the start position releases the lever for biased movement to drive the shutter against the bias to expose the film.

15. The camera of claim 14, wherein rotation of the thumb wheel in the trigger position further drives the lever against the bias.

16. The camera of claim 14, wherein the lever further comprises a stop to limit the movement of the lever against the bias.

17. The camera of claim 16, wherein sprocket defines a catch that engages the stop to limit the movement of the lever against the bias.

18. The camera of claim 17, wherein the camera further defines a camera body and said camera body defines a catch that engages the stop to limit movement of the lever against the bias.

19. The camera of claim 14 further comprising a film frame counter for counting film frames on a roll of film wherein said film frame counter comprises a movable indicator and wherein said sprocket has a counter advancement surface to incrementally advance the film frame counter as the film is wound.

20. The camera of claim 14 wherein said thumb wheel comprises a button projecting axially above the thumb wheel.

21. A camera for capturing images on a perforated film, the camera comprising:

a lens focusing light from a scene onto the film;

a movable shutter biased for movement from a position exposing the film to a position preventing exposure of the film;

a rotatable thumb wheel urged for movement between a start position and a trigger position;

a sprocket having a film engagement surface for engagement with the perforations and movement therewith during film winding; and a biased lever holding the thumb wheel in the start position and moved against the bias by movement of the sprocket to a position permitting the thumb wheel to move into the trigger position, said lever further defining a catch positioned to block movement of the sprocket when the film is advanced by a predetermined amount;

wherein rotation of the thumb wheel in the trigger position further moves the lever against the bias and movement of the thumb wheel from the trigger position to the start position releases the lever for biased movement to drive the shutter to expose the film.

22. The camera of claim 21 further comprising a clutch between the thumb wheel and the film.

23. The camera of claim 21 wherein said clutch further comprises a resilient biasing member to bias the film wheel from the start position toward the trigger position.

24. The apparatus of claim 21 further comprising a biasing member biasing said sprocket against movement with the film and wherein said latch further comprises a sprocket deflection surface to separate the engagement surface from the film perforation after film winding.

25. The apparatus of claim 21 further comprising a biasing member biasing said sprocket against movement with the film and wherein the thumb wheel defines a cam to separate the engagement surface from the film perforation after film winding.

26. The apparatus of claim 21 wherein the thumb wheel further comprises teeth and the biased lever comprises at least one link to engage the teeth and to prevent motion of the thumb wheel in a direction that does not wind the film.

* * * * *